3,063,902
Patented Nov. 13, 1962

1

3,063,902
ANALGESIC ARALKYL-PYRIDINES
Allan Poe Gray and Thomas Beniah O'Dell, Decatur,
Ill., assignors to Irwin Neisler & Co., Decatur, Ill., a
corporation of Illinois
No Drawing. Filed Jan. 18, 1961, Ser. No. 83,365
8 Claims. (Cl. 167—65)

This invention relates to a process for relieving pain, and is more particularly concerned with a process for relieving pain in animals by the administration thereto of aralkyl-pyridine compounds.

The instant invention is based on the unexpected finding that certain phenylalkylpyridine compounds, hereinafter described, exhibit analgesic activity when administered to the animal organism. The compounds useful in the process of the present invention are known in the art of chemistry as phenyl-2-pyridyl-alkanes and have a molecular structure wherein the alkane chain contains 3 to 5 carbon atoms inclusive and the phenyl moiety and 2-pyridyl moiety are separated by at least 3 carbon atoms. The alkane portion of the molecule may bear a hydroxy group as an an additional substituent on a carbon atom other than that which bears the 2-pyridyl moiety. If desired, in place of the hydroxy group, the substituent can be a group convertible to hydroxy, by enzymatic or hydrolytic action in the animal organism. Thus, oxygen containing substituents such as oxo, lower-alkanoyloxy, carbamyloxy and lower-alkyl-carbamyloxy, can be used in place of the hydroxy and are functionally equivalent to the hydroxy in the process of the present invention. The compounds useful in the process of the present invention also include the acid addition salts of such phenyl-2-pyridyl-alkanes, the embodiments of such salts being functionally equivalent to the free bases and in fact constituting another pharmaceutically acceptable form of the compounds.

The term "alkane," as used herein, refers to those alkanes having 3 to 5 carbon atoms inclusive; namely: propane, butane and pentane.

The term "lower-alkanoyloxy," as used herein, refers to those acyl radicals derived from alkanoic acids containing 1 to 6 carbon atoms inclusive such as formoxy, acetoxy, propionoxy, isobutyroxy and the like.

The term "lower-alkylcarbamyloxy," as used herein, refers to acyloxy radicals derived from mono- and di-substituted carbamic acids which bear lower-alkyl substituents containing 1 to 6 carbon atoms on the carbamyl nitrogen atom such as N-methylcarbamyloxy, N-ethylcarbamyloxy, N-butylcarbamyloxy, N,N-dipropylcarbamyloxy and the like.

The terms "pyridyl" and "phenyl" as used herein, include, as the full equivalent of each, respectively, pyridyl and phenyl rings and such rings bearing on the ring in place of a hydrogen atom or atoms, one or more simple substituents which do not adversely affect the pharmacological properties of the compound such as a halo, methyl, methoxy, nitro, amino, trifluoromethyl, and other groups commonly used in the art as substituents on the pyridyl and phenyl rings in preparing chemical compounds having pharmacologic effects in animals.

Compounds useful for the practice of the present invention have been made by methods described in the chemical literature. The acid addition salts are prepared from the free bases in a conventional manner by reacting the free base with the usual inorganic acids, which include for purposes of illustration but without limitation: hydrochloric, hydrobromic, hydriodic, sulfuric and phosphoric; or an organic acid, as, for example, formic, methanesulfonic, tartaric, citric, et cetera.

The following preparations and examples are meant to

2 be illustrative of the processes and products of the present invention and are not to be construed as limiting.

PREPARATION I 2-(3-Phenylpropyl)-Pyridine Hydrochloride

The free base was prepared by the method of Walter and McElvain, J. Am. Chem. Soc., 55:4625 (1933). The hydrochloride was formed as colorless, hygroscopic crystals melting at 76–78 degrees centigrade.

Analysis.—Calculated for $C_{14}H_{16}ClN$: Cl, 15.17. Found: Cl, 15.26.

PREPARATION II 2-(3-Hydroxy-3-Phenylpropyl)-Pyridine Hydrochloride

The free base was prepared by the reaction of 2-picoline with styrene oxide with the aid of sodamide in liquid ammonia. The method is similar to that described by Cislak in U.S. Patent 2,750,392 (1956) for reacting simple alkylene oxides with picoline. The hydrochloride was formed as small colorless needles melting at 108–110 degree centigrade.

Analysis.—Calculated for $C_{14}H_{16}ClNO$: C, 67.34; H, 6.46; Cl, 14.20. Found: C, 67.25; H, 6.49; Cl, 14.21.

The corresponding acyloxy compounds are prepared by reaction of the hydroxy group with acylating agents such as acid halides, acid anhydrides and alkyl isocyanates, as appropriate. Oppenauer oxidation yields the corresponding oxo compound.

PREPARATION III 2-(4-Phenylbutyl)-Pyridine Hydrochloride

The free base was prepared by the method of Bergstrom, Norton and Seibert, J. Org. Chem., 10:452 (1945). The hydrochloride was formed as small colorless needles melting at 114–115 degrees centigrade.

Analysis.—Calculated for $C_{15}H_{18}ClN$: Cl, 14.31. Found: Cl, 14.24.

EXPERIMENT 1.—ACUTE TOXICITY—MICE

The test compounds, in solution in the form of their hydrochloride salts, were administered intravaneously in graded doses to groups of 5 mice and the number of deaths recorded. The dose which should kill 50 percent of the animals (the $LD_{50}$) was calculated using the method of Behrens and Kärber. The results are summarized below:

| Test compound: | $LD_{50}$, mg./kg. |
|---|---|
| 2-(2-phenylethyl)-pyridine | 66 |
| 2-(3-phenylpropyl)-pyridine | 64 |
| 2-(3-hydroxy-3-phenylpropyl)-pyridine | 103 |
| 2-(4-phenylbutyl)-pyridine | 59 |

EXPERIMENT 2.—INCLINED SCREEN—MICE

The procedure was essentially that of the previous experiment except that, instead of death, the endpoint of this experiment is the inability of the test animal to remain on an inclined screen. The $ED_{50}$ is the dose at which 50 percent of the animals should respond as calculated by the method of Behrens and Kärber. The results are summarized below.

| Test compound: | $ED_{50}$, mg./kg. |
|---|---|
| 2-(2-phenylethyl)-pyridine | 34 |
| 2-(3-phenylpropyl)-pyridine | 21 |
| 2(3-hydroxy-3-phenylpropyl)-pyridine | 25 |
| 2-(4-phenylbutyl)-pyridine | 15 |

EXPERIMENT 3.—ANALGESIC—MICE

The test procedure is based on the time of reaction to a stimulus produced by radiant heat employing the "Conduction Dolorimeter" using the hind foot of the mouse as the test organ. Each test compound was administered to groups of 20 mice and their average reaction time to the stimulus compared with that of concurrently tested control groups. The degree of analgesic activity possessed by the test compound is related to the percent increase in reaction time to the stimulus. Evaluation of data from 60 groups of control mice showed that an average increase in reaction time of greater than 14 percent would be highly significant since P, the level of significance, was less than 0.01. The test data are summarized and tabulated below:

| Test Compound—Hydrochloride | Intravenous Dose, mg./kg. | Reaction Time, Percent Increase |
| --- | --- | --- |
| 2-(2-phenylethyl)-pyridine | 2.5<br>5.0 | 7<br>21 |
| 2-(3-phenylpropyl)-pyridine | 1.0<br>2.5<br>5.0 | 21<br>40<br>74 |
| 2-(3-hydroxy-3-phenylpropyl)-pyridine | 1.0<br>2.5<br>5.0 | 22<br>33<br>52 |
| 2-(4-phenylbutyl)-pyridine | 2.5<br>5.0 | 27<br>62 |
| 2-(phenylmethyl)-pyridine | 2.5<br>5.0 | 0<br>0 |

It is thus seen that phenyl-2-pyrodyl-alkanes wherein the alkane portion of the molecule has less than 3 carbon atoms cannot be used for the process of the present invention. The methyl or one-carbon compound exhibits no analgesic activity and the ethyl or two-carbon compound only slight analgesic activity under the conditions of the experiment. The analgesic activity of compounds having more than 5 carbons in the alkane chain falls off in an analogous manner and the 3 to 5 carbon atom limitation here is critical.

EXPERIMENT 4.—ANALGESIC—RABBITS

This test procedure is based on the suppression of the response to pain resulting from stimulation of the tooth pulp. The pain was produced by electrical shocks delivered through shielded spring electrodes inserted into holes previously drilled in each of the two upper teeth. The voltage was varied and when the stimulus reached a painful intensity, the rabbit reacted with movements of its nose and upper lip. Since all determinations were carried out in quadruplicate, it was possible to calculate an $R_{50}$ value, i.e., the voltage at which the rabbit responded to pain 50 percent of the time. Each animal was tested prior to, and at 30, 90 and 150 minutes after intravenous administration of the test compound at a dose level of 5 mg./kg. The degree of analgesic activity is related to the percent change between the pre- and post-treatment $R_{50}$ values and is summarized below:

| Test Compound | Time in Minutes | Reaction Time, Percent Increase |
| --- | --- | --- |
| 2-(3-phenylpropyl)-pyridine | 30<br>90<br>150 | 28<br>17<br>1 |
| 2-(3-hydroxy-3-phenylpropyl)-pyridine | 30<br>90<br>150 | 29<br>29<br>7 |
| 2-(4-phenylbutyl)-pyridine | 30<br>90<br>150 | 24<br>25<br>7 |

Various acyloxy derivatives, lower-alkanoyloxy and lower-alkylcarbamyloxy, have essentially the same pharmacological effect as the corresponding hydroxy compounds because they are hydrolyzed to those compounds in vivo.

While the compounds useful for the analgesic process of the present invention may be administered to the animal organism intravenously or intraperitoneally, it is contemplated that the preferred method of administration will be oral. For oral administration, they may be conveniently administered in the form of essentially pure undiluted compounds if desired, such as in a gelatin capsule. Preferably, for ease of handling, the compounds will be used in intimate association with a pharmaceutical carrier, which may be either a liquid or a solid. When a liquid, it may be in the form of solutions or suspensions of the compounds with flavoring substances included as desired. Sterile water is the preferred liquid carrier, since it readily dissolves the salt forms of the compounds. Solid pharmaceutical carriers such as starch, sugar, talc and the like may be used to form powders. Such powders may be tabletted by the use of suitable lubricants such as magnesium stearate, binders such as gelatin and disintegrating agents like sodium bicarbonate in combination with citric or tartaric acid. The powders may also be used to fill gelatin capsules. The compounds useful in the analgesic process of the present invention may be formed in unit dosages containing predetermined amounts of the useful compounds which may then be administered one or more at a time at regular time intervals to create and maintain effective body levels of the useful compound. Suggested unit dosages for larger animals are 50 to 400 milligrams of useful compounds per tablet or capsule, or a solution or elixir containing 50 to 200 milligrams of useful compound per teaspoonful.

The compounds useful in the analgesic process of the instant invention may, if desired, be combined with other therapeutic agents used to treat conditions causing pain, e.g. with conventional antirheumatic, anti-inflammatory and antipyretic agents such as anti-inflammatory steroids, salicylates, sedatives, antihistaminics, etc. The dosage of the therapeutic agent would be that normally used for the specific drug.

The invention can be embodied in other specific forms without departing from the spirit or essential characteristics thereof. The foregoing physical embodiments of our analgesic process are, therefore, to be considered in all respects illustrative and not restrictive, the scope of the invention being indicated by the appended claims rather than by the foregoing description, and all changes which come within the meaning and range of equivalency of the claims are, therefore, intended to be embraced herein.

We claim:

1. The process of effecting analgesia in animals which comprises introducing into the animal organism dosage units of a pharmaceutically acceptable form of phenyl-2-pyridyl-alkane wherein the alkane chain contains 3 to 5 carbon atoms and the phenyl and pyridyl are separated by at least 3 carbon atoms.

2. The process of effecting analgesia in animals which comprises introducing into the animal organism dosage units of a pharmaceutically acceptable form of $\alpha,\omega$-phenyl-2-pyridyl-alkane wherein said alkane chain is 3 to 4 carbon atoms in length.

3. The process according to claim 2 wherein the phenyl-2-pyridyl-alkane is 2-(3-phenylpropyl)-pyridine.

4. The process according to claim 2 wherein the phenyl-2-pyridyl-alkane is 2-(4-phenylbutyl)-pyridine.

5. The process of effecting analgesia in animals which comprises orally introducing into the animal organism 50 to 400 milligrams of a pharmaceutically acceptable form of phenyl-2-pyridyl-alkane wherein the alkane chain contains 3 to 5 carbon atoms and the phenyl and pyridyl are separated by at least 3 carbon atoms.

6. The process of effecting analgesia in animals which comprises introducing into the animal organism dosage units of a pharmaceutically acceptable form of phenyl-2-pyridyl-hydroxy-alkane wherein the alkane chain contains 3 to 5 carbon atoms; the phenyl and pyridyl are separated by at least 3 carbon atoms; and, wherein said hydroxy substituent is attached to a carbon atom of the alkane chain other than that to which the said 2-pyridyl substituent is attached.

7. The process according to claim 6 wherein the phenyl-2-pyridyl-alkane is 2-(3-hydroxy-3-phenylpropyl)-pyridine.

8. The process of effecting analgesia in animals which comprises orally introducing into the animal organism 50 to 400 milligrams of a pharmaceutically acceptable form of phenyl-2-pyridyl-hydroxy-alkane wherein the alkane chain contains 3 to 5 carbon atoms; the phenyl and pyridyl are separated by at least 3 carbon atoms; and, wherein said hydroxy substituent is attached to a carbon atom of the alkane chain other than that to which the said 2-pyridyl substituent is attached.

References Cited in the file of this patent

Chem. Abs. Decennial Index, vol. 21–30 and vol. 31–40 (Note vol. 27–30, 32, 35, 40).